Dec. 14, 1965 J. W. SCHUTT Re. 25,948

VENTED ACOUSTIC PANEL

Original Filed Jan. 12, 1962

INVENTOR.
JEROME W. SCHUTT
BY
McMorrow, Berman & Davidson
ATTORNEYS

United States Patent Office

Re. 25,948
Reissued Dec. 14, 1965

25,948
VENTED ACOUSTIC PANEL

Jerome W. Schutt, Sacramento, Calif., assignor to Aircoustic Co., Inc., San Francisco, Calif., a corporation of California Original No. 3,159,090, dated Dec. 1, 1964, Ser. No. 165,751, Jan. 12, 1962. Application for reissue May 3, 1965, Ser. No. 457,904
6 Claims. (Cl. 98—40)

Matter enclosed in heavy brackets [ ] appears in the original patent but forms no part of this reissue specification; matter printed in italics indicates the additions made by reissue.

This invention relates to novel ceiling and wall panels, and more particularly to a novel vented panel for use in a false ceiling or other portion of a room defining a space for the passage of air for heating or cooling the room.

A main object of the invention is to provide a novel and improved vented panel of the kind indicated, which is particularly suitable for use as a false ceiling panel to define a space for the passage of heating or cooling air between said panel and the roof above, the panel being provided with vent means to allow a desired amount of the air to escape therethrough to the room, and said vent means being provided with closure elements which may be used, as required, for the purpose of balancing or controlling the flow of the air.

A further object of the invention is to provide an improved vented ceiling panel for use to define an air passage between the same and the roof of a structure, whereby cooling or heating air may be introduced between the panel and said roof, the panel being provided with vents which may be closed, as desired, to provide a balanced flow of air through the panel, the panel being provided with means to protect same against loosening of the fibers thereof around the openings therein, to maintain the openings of constant size and shape, and to provide for selective opening or closing of the apertures in the panel, as required in accordance with the required air flow, or in accordance with other conditions prevailing.

Further objects and advantages of the invention will become apparent from the following description and claims, and from the accompanying drawings, wherein:

Figure 1:
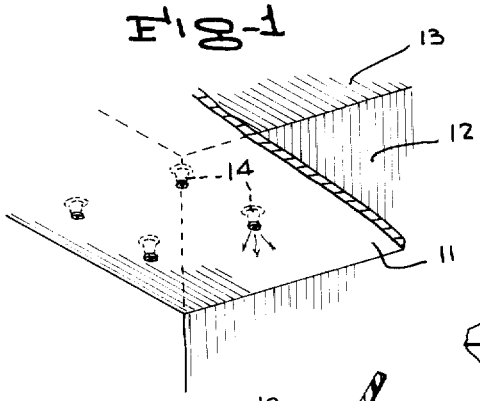
FIGURE 1 is a fragmentary perspective view of a portion of a false ceiling consisting of an improved vented panel according to the present invention.
Figure 2:
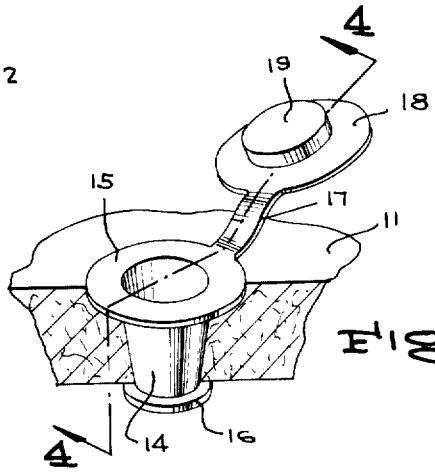
FIGURE 2 is an enlarged perspective view, partly in cross section, of a fragmentary portion of the ceiling panel of FIGURE 1 and showing one of the vent sleeves mounted therein, with the associated closure cup element in open position.
Figure 4:
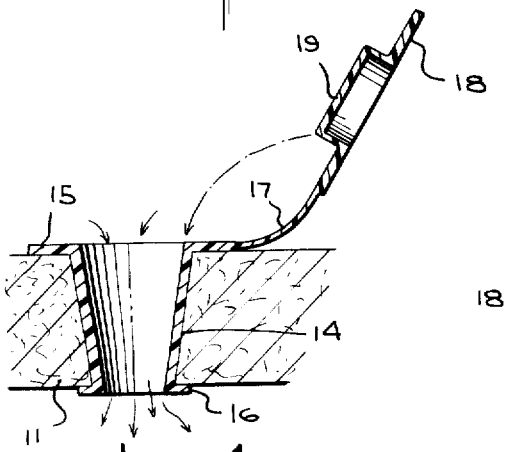
FIGURE 4 is a vertical cross sectional view taken substantially on the line 4—4 of FIGURE 2.

Referring to the drawings, and more particularly to FIGURES 1 to 4, 11 generally designates a ceiling panel which is employed as a false ceiling, or drop ceiling to define an air flow space 12 between the panel 11 and the roof thereabove, said space being used for conveying air for heating or cooling the subjacent enclosure. The ceiling panel 11 is preferably made of fibrous material or similar lightweight durable ceiling board. The panel 11 is provided with a plurality of vent apertures distributed thereover, and mounted in each of the apertures is a protective sleeve 14 of smooth sheet material, the sleeve being provided with outwardly projecting top and bottom annular flanges 15 and 16 engaging the respective top and bottom surfaces of the ceiling panel 11. As shown in FIGURE 4, the sleeves 14 taper downwardly and are of generally frusto-conical shape.

Figure 3:
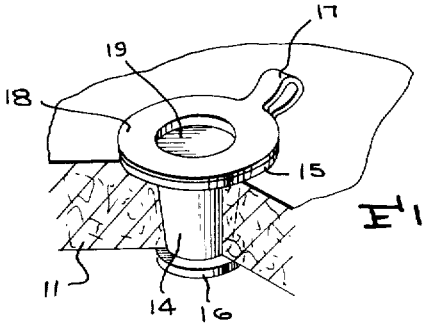
FIGURE 3 is a perspective view similar to FIGURE 2 but showing the closure cup element in closed position.

Formed integrally with the top flange 15 of each sleeve 14 is a flexible strap element 17 which extends radially outwardly and which merges integrally with the annular flange 18 provided on a generally cylindrical closure cup element 19 adapted to sealingly and removably fit into the top end of the associated sleeve 14, as shown in FIGURE 3. Thus, when it is desired to close off designated vent openings in the ceiling panel 11, the cup elements 19 are engaged in the top portions of their associated sleeves 14 with the flanges 18 of the cup elements engaging on the top flanges 15 of the sleeves in the manner illustrated in FIGURE 3. Any desired number of the vent openings may thus be closed off, whereby to provide a desired degree of air retention in the space 12, or viewed differently, to provide a desired amount of venting of the air furnished to said space 12. The number of sleeves 14 provided in the panel and their arrangement are in accordance with the maximum requirements of the enclosure with which the panel is employed, and the venting from the space 12 may be regulated by closing off an appropriate number of the vent sleeves 14.

The sleeves 14 are preferably formed of suitable high density plastic material, such as high density polyethylene.

Figure 6:
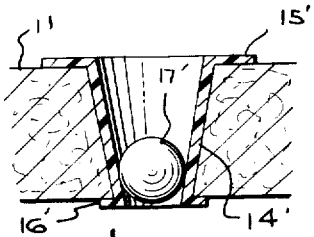
FIGURE 6 is a vertical cross sectional view taken substantially on the line 6—6 of FIGURE 5.
Figure 5:
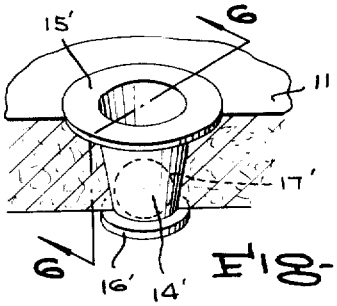
FIGURE 5 is a perspective view similar to FIGURES 2 and 3, but showing a modified form of protective sleeve mounted in a ceiling panel to define a vent aperture therein, according to the present invention.

In the modified form of the invention illustrated in FIGURES 5 and 6, the downwardly tapering generally frusto-conical sleeves, shown at 14', are provided with the top and bottom flanges 15' and 16', and spherical plastic sealing balls 17' are inserted in selected sleeves 14' to seal same. As shown in FIGURE 6, the sealing balls 17' sealingly engage in the bottom portions of the sleeves 14' to seal the vents. As in the previously described form of the invention, a desired number of the vent sleeves remain unsealed to provide the required amount of air escape from the space 12 into the subjacent enclosure.

The high density plastic sleeves 14 or 14' are inserted in conical holes formed in the ceiling panel 11 and act as protective means to retain the loosened fibers at the inside surfaces of the vent holes and to prevent such loosened fibers from filtering down into the occupied room area below. As will be readily apparent, the annular top and bottom flanges 15, 16 or 15', 16' serve to positively retain the sleeves in the vent apertures and to lock same against upward movement. The sleeves 14 or 14' serve not only as protective means for the downwardly tapering apertures formed in the panel 11, but also to prevent the apertures from being distorted in size or shape by the passage of air therethrough, and also to provide a means for receiving a sealing element, such as the sealing cup element 19 of FIGURES 1 to 4 or the sealing spherical ball 17' of FIGURES 5 and 6.

The ceiling panel 11 provided with the vent sleeves, as above described, may be designed for installation in any standard suspended grid system.

While certain specific embodiments of an improved vented panel have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A vented panel of the character described comprising a flat substantially rigid body composed of fibrous material, said body being formed with venting apertures distributed thereover, respective annular protective sleeves of smooth sheet material disposed in said apertures, said sleeves being provided with outwardly projecting top [and bottom] annular flanges engaging [respective opposite surfaces] *the top surface* of the body, and respective closure elements removably disposed in said sleeves and sealingly engaging the inside wall surfaces of said sleeves below the plane of the [top] annular flanges.

2. A vented panel of character [describe] *described* comprising a flat substantially rigid body composed of fiibrous material, said body being formed with venting apertures distributed thereover, respective downwardly tapering, substantially frusto-conical annular protective sleeves of smooth plastic material disposed in said apertures, said sleeves being provided with outwardly projecting integral top [and bottom] annular flanges engaging the [respective opposite] *top* surface of the body, and respective closure elements removably disposed in said sleeves and sealingly engaging the inside wall surfaces of said sleeves below the plane of the [top] annular flanges.

3. A vented panel of the character described comprising a flat substantially rigid fibrous material body, said body being formed with venting apertures distributed thereover, respective downwardly tapering, substantially frusto-conical annular protective sleeves of smooth plastic material disposed in said apertures, said sleeves being provided with outwardly projecting integral top [and bottom] annular flanges engaging the [respective opposite surfaces] *top surface* of the body, respective closure elements removably disposed in said sleeves, and flexible strap elements integrally connecting the closure elements to the top flanges of said protective sleeves.

4. A vented panel of the character described comprising a flat substantially rigid fibrous material body, and body being formed with venting apertures distributed thereover, respective downwardly tapering, substantially frusto-conical annular protective sleeves of smooth polyethylene material disposed in said apertures said sleeves being provided with outwardly projecting integral top [and bottom] annular flanges engaging the [respective opposite surfaces] *top surface* of the body, respective closure cup elements sealingly and removably fitting in the top ends of said sleeves and provided with outwardly extending rim flanges engageable on the top flanges of the sleeves, and flexible strap elements integrally connecting said rim flanges to said top flanges.

5. A vented panel of the character described comprising a flat substantially rigid fibrous material body, said body being formed with venting apertures distributed thereover, respective downwardly tapering, substantially frusto-conical protective sleeves of smooth polyethylene material disposed in said apertures, said eleeves being provided with outwardly projecting integral top [and bottom] annular flanges engaging the [respective opposite surfaces] *top surface* of the body, and respective sealing closure elements removably disposed in and flexibly attached to said sleeves.

6. A vented panel of the character described comprising a flat substantially rigid body composed of fibrous material, said body being formed with venting apertures distributed thereover, respective annular protective sleeves of smooth sheet material disposed in said apertures, said sleeves being provided with outwardly projecting top [and bottom] annular flanges engaging [respective opposite surfaces] *the top surface* of the body, and respective closure elements removably disposed in said sleeves and flexibly attached thereto, said closure elements sealingly engaging the inside wall surfaces of said sleeves below the plane of the top annular flanges.

References Cited by the Examiner

The following references, cited by the Examiner, are of record in the patented file of this patent or the original patent.

UNITED STATES PATENTS

| | | | |
|---|---|---|---|
| 2,644,609 | 7/1953 | Foss | 98—37 X |
| 2,764,929 | 10/1956 | Tegarty | 98—37 |
| 2,807,993 | 10/1957 | Ericson | 98—40 |
| 2,996,138 | 8/1961 | Schwartz et al. | 98—40 X |

WILLIAM F. O'DEA, *Primary Examiner.*